United States Patent [19]

Mangels

[11] 4,235,857
[45] Nov. 25, 1980

[54] METHOD OF NITRIDING SILICON

[75] Inventor: John A. Mangels, Flat Rock, Mich.

[73] Assignee: Ford Motor Company, Dearborn, Mich.

[21] Appl. No.: 54,214

[22] Filed: Jul. 2, 1979

[51] Int. Cl.$^3$ .............................................. C01B 21/06
[52] U.S. Cl. .................................... 423/344; 423/406
[58] Field of Search ................................ 423/344, 406

[56] References Cited

U.S. PATENT DOCUMENTS

| 3,839,541 | 10/1974 | Lumby et al. | 423/344 |
|---|---|---|---|
| 3,937,792 | 2/1976 | Lumby | 423/344 |
| 4,022,872 | 5/1977 | Carson et al. | 423/344 X |

OTHER PUBLICATIONS

"Handbook of Chemistry and Physics"-1976-1977-57th Ed., p. E-2.
Atkinson et al., "J. of Material Science", 10 (1975), p. 124-2.
Aktinson et al., "J. of the Amer. Ceram. Soc.", vol. 59, 1976.

*Primary Examiner*—Jack Cooper

*Attorney, Agent, or Firm*—William E. Johnson; Keith L. Zerschling

[57] ABSTRACT

A method of manufacturing silicon nitride particles, either in an aglomerated or unaglomerated form, is disclosed. Basically, the particles to be nitrided are placed in an enclosed furnace and heated to a suitable temperature at which the enclosed furnace is filled with an initial gaseous mixture of nitrogen and hydrogen, the mixture containing not more than about 6% by volume hydrogen. Thereafter, the material is heated in the enclosed furnace to a temperature of about 900° C. to about 1000° C. at which time the nitrogen starts to react with the silicon in the furnace. Thereafter, the enclosed furnace is demand filled with a nitriding gas mixture consisting essentially of 1 to 10% by volume helium and about 99 to 90% by volume nitrogen. The furnace is heated to a suitable nitriding temperature and the demand filling of the chamber with the nitriding gas helium/nitrogen combination is continued until the nitriding operation is terminated. The enclosed furnace is then cooled to room temperature and the nitrided silicon material recovered. The use of helium in the nitriding gas obtained all of the benefits one obtains when nitriding gas is a combination of hydrogen and nitrogen, but does not produce an explosive mixture.

6 Claims, No Drawings

METHOD OF NITRIDING SILICON

BACKGROUND OF THE INVENTION AND PRIOR ART STATEMENT

U.S. Pat. No. 3,937,792 discloses a method of manufacturing silicon nitride powder. The process includes a step of controlling the exothermic reaction between silicon and nitrogen. The control is made by diluting the nitrogen nitriding gas with an inert gas, specifically, argon. During the nitriding process, if the exothermic reaction is too great, argon is bled into the reaction chamber in order to slow down the reaction. The patentees also propose that the chamber be totally evacuated to reduce the exotherm. This patent does not, in any manner, disclose the use of helium gas as a constituent of the gases used during the nitriding of silicon.

U.S. Pat. No. 4,022,872 deals with the manufacture of finely divided refractory powders using helical flow of hot plasma gases. The patent indicates that hydrogen is the preferred plasma gas, but also indicates that argon, neon and helium are also suitable plasma gases. This patent was cited during a novelty study on this subject matter apparently for the reason that argon, neon and helium, at least for the purpose of plasma gases, were the equivalent of helium. However, as will be demonstrated subsequently in this specification, helium and argon do not affect a nitriding system in the same manner. There are substantial differences between a nitriding system in which helium is used and a nitriding system in which argon is used.

In reports entitled "Nitridation of High-Purity Silicon" contained in both the Journal of Material Sciences, Vol. 10 (1975), page 1242, and in the Journal of American Ceramic Society, Vol. 59, No. 7-8, 1976, page 258, Messrs. A. Atkinson et al reported that the lower the nitriding gas pressure in a nitriding operation, the greater the mass of nitride eventually formed. These articles, however, do not mention the use of a helium addition to a nitriding atmosphere in such a manner that the pressure of the nitriding gas is reduced continuously over the period of the nitriding operation. This factor will also be discussed in greater detail hereinbelow.

SUMMARY OF THE INVENTION

This invention relates to a method of nitriding silicon particles, and, more particularly, to a method of nitriding silicon particles whether the particles are in an individual finely subdivided state or in an aglomerated state in which they define the general configuration of an article.

In accordance with the teachings of the method of this invention, silicon particles are nitrided in the following manner. The silicon particles to be nitrided are placed in an enclosed furnace. As previously stated, the silicon particles can be in an unaglomerated state or in an aglomerated state. A vacuum is drawn on the enclosed furnace. The enclosed furnace is then heated to a temperature in a range from about 600° C. to about 700° C. so that impurities are removed from the silicon particles.

The enclosed furnace is then filled after it has been heated to a temperature in the range of about 600° C. to about 700° C. with a gaseous mixture of nitrogen and hydrogen. This initial gas mixture contains not more than about 6% by volume of hydrogen.

The enclosed furnace with the gaseous hydrogen/nitrogen mixture therein is then heated to a temperature in the range from about 900° C. to about 1000° C. When the temperature reaches this particular range, the nitrogen begins to react slowly with the silicon to form silicon nitride. As the reaction progresses, the nitrogen is depleted from the atmosphere within the enclosed furnace and the same must be replenished. The atmosphere is replenished by a demand filling of the enclosed furnace after it has been heated to the temperature in the range from about 900° C. to about 1000° C. with a nitriding gaseous mixture. This nitriding gaseous mixture consists essentially of about 1 to 10% by volume helium and about 99 to 90% by volume nitrogen. Upon introduction of this nitriding gaseous mixture, one would then have in the enclosed furnace the hydrogen gas initially introduced, the nitrogen gas remaining from that which was initially introduced, and the nitrogen gas newly introduced from the nitriding gas along with the helium of the nitriding gas.

The enclosed furnace is heated to a selected reaction temperature, which reaction temperature is below the melting temperature of silicon, of about 1420° C. Depending upon the article to be nitrided, this final reaction temperature can be anywhere in the range from about 1350° C. to about 1420° C., as is well known in the art.

During the nitriding of the article, the demand filling of the enclosed furnace is continued so that an adequate pressure is maintained within the enclosed furnace for the nitriding operation. As the demand filling with the nitriding gas is continued, it is apparent that the hydrogen content will remain essentially constant for the atmosphere within the enclosed furnace while the helium content of the gas will increase and the overall nitrogen content of the gas will decrease. This occurs because only the nitrogen of the nitriding gas is consumed in the nitriding operation. The hydrogen remains essentially constant because none of this material is consumed and no additional amount of this gas is introduced. The helium pressure increases because this material is introduced in the demand introduction of the nitriding gases but it is not consumed.

The demand filling of the enclosed furnace with the helium/nitrogen gas combination continues until the nitriding operation is terminated. Those skilled in the art are aware of when the nitriding operation is completed by means of equipment which monitors whether or not newly introduced nitrogen gas is being consumed. Those skilled in the art are also aware of many ways of introducing a nitriding gas as demanded by the nitriding cycle going on in the enclosed furnace.

When the nitriding operation is completed, the enclosed furnace is cooled back to room temperature. No particular atmosphere need be used in this cooling operation, and the simple expedient is to leave that atmosphere which was contained therein at the termination of the nitriding cycle. Once the material is cooled back to room temperature, the nitrided silicon material is recovered from the enclosed furnace.

I have discovered two things in the use of helium as a diluting gas for the nitriding cycle. The two principal benefits are as follows. The helium does not create an explosive mixture when mixed with nitrogen such as a mixture of hydrogen and nitrogen would create. The second great benefit of using helium is that the helium has an extremely high thermal conductivity and it assists in the dissipation of the heat generated during the nitriding of the silicon when the silicon is reacting with the nitrogen gases present. By using the same, I have found that the strengths of the final article are equivalent to those obtained if a nitrogen/hydrogen gas combination is used in the nitriding cycle, and substantially superior strengths to any strengths obtained in a finished article when a nitrogen/argon gas mixture is used as the nitriding gas. This factor will be demonstrated in a subsequent portion of this specification.

DESCRIPTION OF THE PREFERRED EMBODIMENT

The novel features that are considered characteristic of the invention are set forth with particularity in the appended claims. The invention itself, however, both as to its organization and its method of operation, together with additional objects and advantages thereof, will best be understood from the following description of specific embodiments.

In accordance with the teachings of the method of this invention, silicon particles may be nitrided as follows. The silicon particles selected generally are particles having a size in the range of less than 30 microns. These particles may be nitrided as an unconsolidated mass or may be nitrided in a consolidated condition. Those skilled in the art know of many ways of consolidating silicon particles into the shape of a desired article. For example, such techniques as slip casting and injection molding of silicon particles are known to those skilled in the art for forming a consolidated mass of silicon particles which may subsequently be nitrided.

I have found that if the techniques of the method of my invention are used on unconsolidated particles, the resulting silicon nitride powder is high in alpha silicon nitride content and is an extremely superior beginning material for use in hot pressing of such powders to manufacture silicon nitride parts. I have also found that if the method of my invention is used in the nitriding of consolidated particles, the particles have an extremely high strength characteristic equivalent to or better than those obtained when a nitrogen/hydrogen gas combination is used in a nitriding operation, and also better than when pure nitrogen is used as the nitriding gas. By eliminating the use of a nitrogen/hydrogen gas combination during a nitriding cycle, one eliminates the hazzardous explosion possibilities that can be encountered in such a gas when the total buildup of hydrogen in the system is about 6% by volume or more. Such a buildup would occur if a nitrogen/hydrogen demand gas is used in a nitriding cycle because the nitrogen is consumed while the hydrogen remains behind to build up in the enclosed furnace.

The silicon particles to be nitrided, whether in an unconsolidated or a consolidated form, are placed in an enclosed furnace. Gas connecting systems are provided for adding gas to the enclosed furnace and the structure is provided for heating the furnace, as is well known in the art. In accordance with my practice, a vacuum is drawn on the enclosed furnace initially to remove various contaminants therefrom.

The enclosed furnace is preferably heated to a temperature in the range from about 600° C. to 700° C. while the vacuum is still drawn thereon. This heating permits an outgassing of the silicon particles to be nitrided, and also eliminates from the material certain contaminants such as hydrocarbons from any binders and also absorbed oxygen. After the enclosed furnace has been heated to the temperature in the range of about 600° to about 700° C., the enclosed furnace is filled with a gaseous mixture of nitrogen and hydrogen, the mixture containing not more than about 6% by volume hydrogen. This initial gaseous mixture is introduced for the following reasons. The hydrogen is effective in reducing such contaminants as silicon dioxide. I prefer to have a positive pressure in my enclosed furnace of about 3 psig. However, any positive pressure may be used, and I would suggest that it normally be limited to a pressure in the range of 15 psig, depending upon the pressure characteristics of the furnace. The skilled artisan generally is aware of the pressure limitations of the particular furnace used. I normally suggest that once a particular nitriding pressure is selected, that pressure be maintained generally about the same level throughout the nitriding operation. If desired, one may introduce the initial gas to the enclosed furnace before any heating of the furnace is undertaken.

The enclosed furnace with its initial gaseous mixture therein is heated to a temperature in a range from about 900° C. to about 1000° C. At this temperature, the nitrogen contained in the initial gaseous mixture starts to react with the silicon to form silicon nitride. As the nitrogen of the initial gaseous mixture does react, the pressure within the enclosed furnace falls and it is necessary to add more nitrogen gas. However, generally the hydrogen is not consumed so its total pressure within the enclosed furnace remains relatively constant while the pressure of nitrogen decreases.

In accordance with the teachings of the method of my invention, demand filling of the enclosed furnace after it has been heated to a temperature in the range from about 900° C. to about 1000° C. commences when the total overall pressure of nitrogen gas decreases within the furnace. The demand filling is with a nitriding gas mixture consisting essentially of about 1 to 10% by volume helium and about 99 to 90% by volume nitrogen. Sufficient amounts of this gas is introduced into the furnace to raise the total pressure within the furnace back to that level desired, in my case preferably about 3 psig. Because the hydrogen pressure within the furnace remains relatively constant, and the newly introduced gas is a mixture of nitrogen and helium, the overall partial pressure of nitrogen within the confines of the enclosed furnace is slightly reduced, even though the total pressure therewithin is about the same.

The enclosed furnace is thereafter heated to a selected reaction temperature below the melting temperature of silicon which is approximately 1420° C. I prefer to heat the enclosed furnace to a temperature in the range of about 1350° C. to about 1420° C. for the final reactions, depending upon the total amount of material contained within the furnace. During this continued heating, the nitriding operation progresses in a manner in which nitrogen in the atmosphere within the enclosed furnace is used up during its reaction with the silicon. The use of the nitrogen is monitored by suitable equipment known in the art, and at intervals determined by the reaction rate, additional nitriding gas, that is the helium/nitrogen combination gas, is introduced into the furnace to bring back the full nitriding pressure, which in my preferred case is 3 psig. Once again, it is apparent that as additional nitriding gas is introduced, the total hydrogen partial pressure within the furnace remains relatively constant, whereas the partial pressure of helium is increased and that of nitrogen is decreased. This occurs because the helium is not used up, and as more of this material is introduced, it simply reduces the total amount of nitrogen which can find its way into the enclosed furnace at the particular nitriding pressure I desire to use.

The demand filling of the enclosed furnace is continued with the nitriding gas combination of helium and nitrogen until the nitriding operation is terminated. The period of time for nitriding, of course, varies in dependence upon the amount of material within the furnace. For example, if the furnace load is 2400 grams of silicon, the approximate nitriding time would be 95 hours, whereas if the furnace load is 4500 grams, then the nitriding time would be 130 hours. It is, of course, apparent that the larger the furnace load, the more nitriding gas will have been introduced into the enclosed furnace and higher will be the amount of helium found in the furnace at the termination of the nitriding operation. Those skilled in the art are well aware of methods for determining the temination of the nitriding processes, as is evidenced by the teachings of the aforementioned U.S. Pat. No. 3,937,792.

Once the nitriding operation has been completed, I simply turn off the furnace and allow it to cool back to room temperature with the gases therein being generated as a final composition because of the nitriding operation. If one desires, however, the furnace may be back filled with nitrogen or any other suitable inert gas, or may simply be evacuated during the cooling operation. Once the material has been cooled back to room temperature, the nitrided silicon material is recovered from the enclosed furnace. No particular cooling cycle is required, the easiest beng simply to turn off the furnace and allow it to dissipate its heat to the surrounding atmosphere.

EXAMPLES

In order to demonstrate the method of this invention and its comparison to other nitriding atmospheres, the following examples are used. In all cases, the procedure is exactly as specified above, changes being made only in the nitriding gas mixture introduced during the nitriding portion of the method.

EXAMPLE 1

The initial gaseous mixture introduced into the furnace consisted of 4% hydrogen, 96% nitrogen. The nitriding gas used consisted of 7% helium, 93% nitrogen. The furnace load was 4800 grams, and a nitriding time of 160 hours was required. The final product had a density of 2.7 grams per cc, and a strength of 48 Kpsi as measured by a Modulus of Rupture test. The articles produced were test bars having a general configuration of $\frac{1}{8}'' \times \frac{1}{4}'' \times 2''$, as well as various turbine parts such as stutors, nose cones, shrouds and rotors.

EXAMPLE 2

The procedure of Example 1 was repeated in exactly the same manner. However, in this case, the nitriding gas was a gas consisting of 4% argon, 96% nitrogen. The furnace load in this case was 3800 grams, and the nitriding time was 130 hours. The final density of the mateial produced was 2.7 grams per cc, but the strength was only 39 Kpsi. Additional data from the argon run also showed that the degree of nitriding was not as good as with the helium run. In the case of the argon run, the microstructure of the silicon nitride produced showed some regions of unreacted silicon and large grains typical of those formed when nitriding exotherm is dominating the reaction. Example 1, namely the helium run, shows much less of this behavior because helium is not equivalent to argon in the fact that its thermal conductivity is substantially higher than argon. I believe that this higher thermal conductivity gas allows the heat generated during the reaction of the nitrogen and the silicon to be dissipated more rapidly than in the case where an argon atmosphere is used. By dissipating the heat more rapidly, the problems produced, such as unreacted silicon and large grains, are eliminated.

EXAMPLE 3

Another run equivalent to those of Example 1 and 2 was made, but in this case the nitriding gas was a gaseous mixture consisting of 4% hydrogen and 96% nitrogen. The final nitriding atmosphere developed by use of this gas was an explosive mixture and normally one would not want to fool around with such. The furnace load in this case was 2500 grams with a nitriding time of 160 hours. The silicon nitride had a final density of 2.7 grams per cc, and a strength of 45 Kpsi, approximately the same as the one developed by use of helium/nitrogen gas combination, but substantially greater than the strength developed when an argon/nitrogen gas combination was used as the nitriding material.

EXAMPLE 4

Another run equivalent to those of the preceding examples was made, but, in this case, the nitriding gas was pure nitrogen gas. The furnace load was 2500 grams with a nitriding time of 175 hours. The silicon nitride had a final density of 2.7 grams per cc and a strength of only 30.5 Kpsi. This demonstrates that a nitriding atmosphere which does not contain a diluent gas results in the production of inferior strengths in the final silicon nitride material.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A method of nitriding silicon particles which comprises the steps of:
   placing the silicon particles to be nitrided in an enclosed furnace;
   filling said enclosed furnace with an initial gaseous mixture of nitrogen and hydrogen, said mixture containing not more than about 6% by volume hydrogen;
   heating said enclosed furnace with said gaseous mixture therein to a temperature in a range from about 900° C. to about 1000° C.;
   demand filling said enclosed furnace after it has been heated to said temperature in the range from about 900° C. to about 1000° C. with a nitriding gas mixture consisting essentially of about 1 to 10% by volume helium and about 99 to 90% by volume nitrogen;
   continue heating said enclosed furnace to a reaction temperature below the melting temperature of silicon;
   continue demand filling of said enclosed furnace with said helium/nitrogen gas combination until the nitriding operation is terminated;
   cooling the enclosed furnace to room temperature; and recovering the nitrided silicon material from the enclosed furnace said nitrided silicon material exhibiting a greater strength than a nitrided silicon material prepared according to said method wherein argon is used in place of helium.

2. The method of claim 1 wherein: said silicon particles are aglomerated into an article.

3. The method of claim 1 wherein: said silicon particles are not aglomerated into an article.

4. A method of nitriding silicon particles which comprises the steps of:

placing the silicon particles to be nitrided in an enclosed furnace;

drawing a vacuum on said enclosed furnace;

heating said enclosed furnace to a temperature in a range from about 600° C. to about 700° C.;

filling said enclosed furnace after it has been heated to the temperature in the range from about 600° C. to about 700° C. with an initial gaseous mixture of nitrogen and hydrogen, said mixture containing not more than about 6% by volume hydrogen;

heating said enclosed furnace with said gaseous mixture therein to a temperature in a range from about 900° C. to about 1000° C.;

demand filling said enclosed furnace after it has been heated to said temperature in the range from about 900° C. to about 1000° C. with a nitriding gas mixture consisting essentially of about 1 to 10% by volume helium and about 99 to 90% by volume nitrogen;

continue heating said enclosed furnace to a reaction temperature below the melting temperature of silicon;

continue demand filling of said enclosed furnace with said helium/nitrogen gas combination until the nitriding operation is terminated;

cooling the enclosed furnace to room temperature; and recovering the nitrided silicon material from the enclosed furnace said nitrided silicon material exhibiting a greater strength than a nitrided silicon material prepared according to said method wherein argon is used in place of helium.

5. The method of Claim 4 wherein: said silicon particles are aglomerated into an article.

6. The method of claim 4 wherein: said silicon particles are not aglomerated into an article.

* * * * *